United States Patent [19]

White

[11] Patent Number: 4,591,174

[45] Date of Patent: May 27, 1986

[54] SNOW SLIDER REPLACEMENT SYSTEM AND METHOD

[76] Inventor: Gilbert T. White, Rte. 1, Box 670, Grand Marais, Minn. 55604

[21] Appl. No.: 568,589

[22] Filed: Jan. 6, 1984

[51] Int. Cl.$^4$ ............................................. B62B 17/02
[52] U.S. Cl. .................................... 280/28; 280/12 A
[58] Field of Search ...................... 280/28, 12 A, 12 R

[56] References Cited

U.S. PATENT DOCUMENTS

| | | | |
|---|---|---|---|
| 223,062 | 12/1879 | Nichols | 280/28 |
| 286,371 | 10/1883 | Baldwin | 280/28 |
| 323,234 | 7/1885 | Thompson | 280/28 |
| 375,214 | 12/1887 | Stevens | 280/28 |
| 488,266 | 12/1892 | Jordon | 280/28 |
| 1,670,226 | 5/1928 | Anderson . | |
| 2,016,187 | 10/1935 | Vincent | 280/28 |
| 2,938,879 | 5/1960 | Mock et al. | 260/32.6 |
| 3,034,800 | 5/1962 | Campbell | 280/18 |
| 3,120,963 | 2/1964 | Seckel | 280/28 |
| 3,738,676 | 6/1973 | Hand | 280/22 |
| 3,751,057 | 8/1973 | Matthiessen | 280/28 |
| 3,850,440 | 11/1974 | Reedy et al. | 280/28 |
| 4,314,708 | 2/1982 | Zuuring | 280/11.18 |

FOREIGN PATENT DOCUMENTS

| | | | |
|---|---|---|---|
| 675738 | 5/1939 | Fed. Rep. of Germany | 280/604 |
| 2752397 | 6/1978 | Fed. Rep. of Germany | 280/604 |
| 122872 | 11/1969 | Norway | 280/11.18 |
| 340139 | 9/1959 | Switzerland | 63 B/21 |

*Primary Examiner*—David M. Mitchell
*Assistant Examiner*—Eric D. Culbreth
*Attorney, Agent, or Firm*—Kinney & Lange

[57] ABSTRACT

A system for quickly and replaceably securing snow surface sliders to a structural sled runner includes a slide rail fixedly secured to the bottom of the sled runner along both its longitudinally extending straight main portion and its upwardly curved front end portion and a snow surface slider removably mounted to the slide rail. The surface slider and slide rail have mating longitudinally extending dovetail portions to permit longitudinal sliding movement of the surface slider with respect to the sled runner. The dovetail portions of the slide rail and the surface slider are of construction and configuration such that the surface slider is removable from the slide rail by peeling the surface slider laterally off of the slide rail. The surface slider is held in position against longitudinal movement with respect to the sled runner by a releasable fastener proximate only an upper end of the curved front portion of the sled runner. The slider replacement system as described is suitable for use in performing the method of quickly replacing one surface slider mounted to the structural sled runner with another surface slider.

15 Claims, 16 Drawing Figures

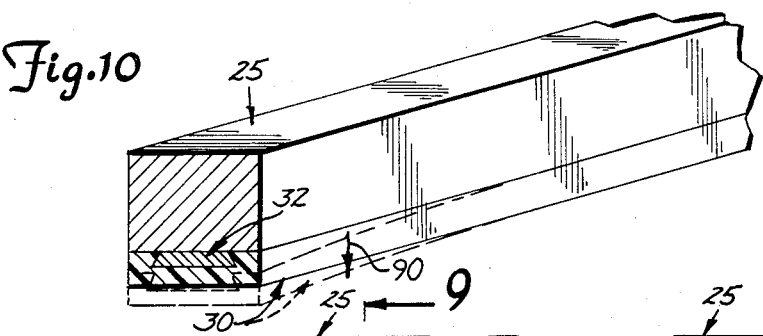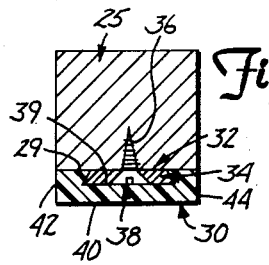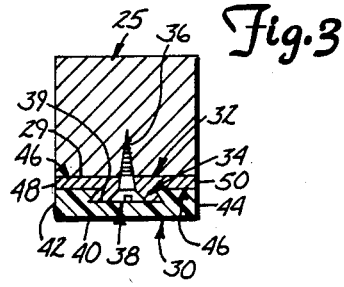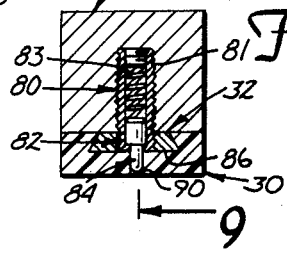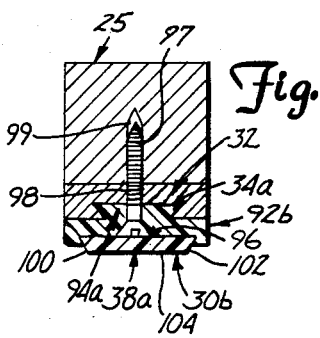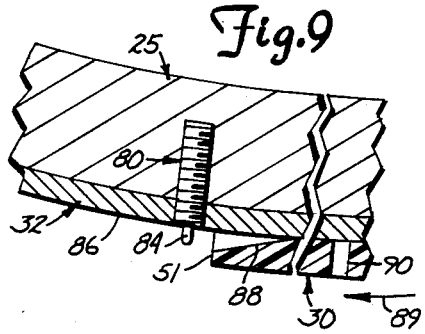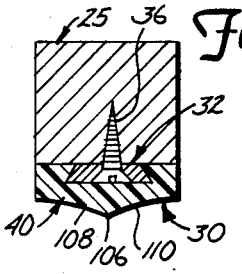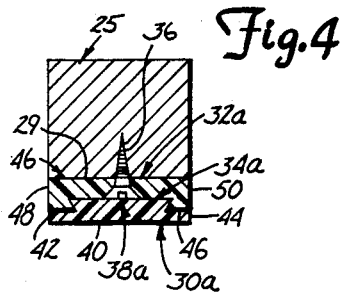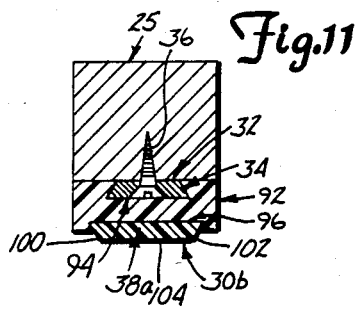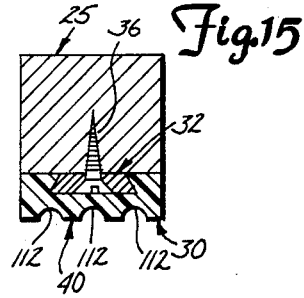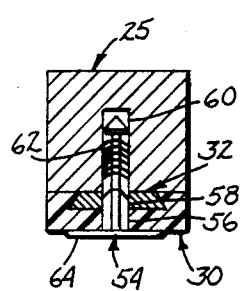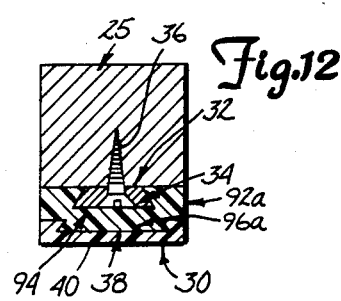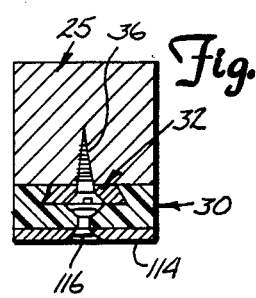

SNOW SLIDER REPLACEMENT SYSTEM AND METHOD

BACKGROUND OF THE INVENTION

1. Field of the Invention

The present invention relates to snow surface slider mounting systems for structural sled runners of snow travel vehicles such as dog sleds, and particularly to a system and method for quickly and replaceably securing surface sliders to a structural sled runner.

2. Description of the Prior Art

It is quite common to attach low friction or wear resistant snow sliding surface runners to the bottom of sled runners or skiis on snow travel vehicles such as dog sleds or sleighs, or to landing skiis on airplanes. A number of plastics are good, general purpose, low friction bearing materials, but sliding on snow is a special situation. In practice, only two types of plastics are now commonly used with good results: ethylene and tetrafluorethylene polymers. U.S. Pat. No. 2,938,879, granted to Mock et al. on May 31, 1960, which is hereby incorporated by reference, further discusses polyethylene compounds and compositions having low friction coefficients. Such slider material compounds often include surface active agents or slip additives to further increase snow sliding performance.

There is no single optimum slider material for all snow trail conditions, however. The sliding performance of a surface slider on snow is a function of a number of variables, including snow conditions, speed, loading and slider geometry and composition. At times, the snow surface slider must also operate under conditions of severe abrasion as on sections of trail where no snow is present. Certain materials wear or otherwise perform better under such circumstances. For these reasons, it is desirable to provide means to interchange surface sliders of different material composition and geometry not only as they become worn, but sometimes more frequently to insure optimum performance under the prevailing trail conditions.

Prior surface sliders have been secured to sled runners in a variety of ways. One common method is to adhesively bond the surface slider to the sled runner. Unfortunately, many materials which perform well sliding on snow are difficult to bond adhesively. For example, surface sliders of typical low friction polymers such as ethylene or tetrafluorethylene or other fluoro carbons would be desirable because of their superior sliding performance with respect to snow. Because of their low surface energy, however, such materials require special preparation of the surface of the side of the slider to be adhered to the sled runner. Etching, oxidation or abrasive treatment has been used to permit the use of conventional adhesives. An additional difficulty has been encountered in the use of adhesives in that they must be applied under controlled conditions of temperature and/or pressure until the adhesive is partially cured. This makes the changing of surface sliders on a sled runner in the uncontrolled conditions of the field quite difficult, if not impossible.

Another method previously employed to secure surface sliders to sled runners is to provide a mating dovetail arrangement between portions of the surface slider and sled runner. This means of attachment is shown in the following United States patents which are hereby incorporated by reference:

| U.S. Pat. No. | Patentee | Issue Date |
|---|---|---|
| 488,266 | Jordan | 12/20/1892 |
| 375,214 | Stevens | 12/20/1887 |
| 323,234 | Thompson | 07/28/1885 |
| 286,371 | Baldwin | 10/09/1883 |
| 223,062 | Nichols | 12/30/1879 |

The surface sliders of these patents are either permanently affixed to the sled runner or are quite difficult and cumbersome to remove and/or replace. In the device of the Baldwin patent, for example, the surface slider is held to the sled runner by a plurality of countersunk screws extending upwardly through the slider into the sled runner along the entire length thereof. To replace the surface slider of Baldwin (if that is possible) would necessitate the removal of each screw, a time consuming and laborious task in the field. In addition, once a replacement surface slider has been fitted onto the sled runner, each screw must be inserted again, and such fasteners create interference with the snow sliding surface of the surface slider. Another disadvantage from using fasteners such as those shown in Baldwin is that the surface slider material must be adequately thick to permit the countersinking of the screw heads and to prevent lifting or buckling between fasteners, which necessarily depends upon the spacing of the fasteners and the rigidity of the surface slider material.

Other attempts to fasten surface sliders to the bottom of sled runners or skiis are shown in the following United States patents which are hereby incorporated by reference:

| U.S. Pat. No. | Patentee | Issue Date |
|---|---|---|
| 2,016,187 | Vincent | 10/01/35 |
| 3,120,963 | Seckel | 02/11/64 |
| 3,751,057 | Matthiessen | 08/07/73 |

The surface slider attachment schemes shown in these patents are not longitudinal dovetail arrangements, but do show surface sliders configured in lateral cross-section to conform to the shape of a sled ski and means for securing these surface sliders with respect thereto. The surface sliders shown in these patents are not easily removable or easily changed in the field, however.

The use of tetrafluorethylene and ethylene polymer compounds as materials for snow surface sliders in prior art surface slider application schemes is subject to some or all of the following limitations: (1) high material cost (the slider must be relatively thick to attain the necessary rigidity to avoid buckling); (2) limited availability; (3) difficult, costly and time consuming to adhere to a sled runner; and (4) difficult and time consuming to attach with mechanical fasteners, with impaired performance by the exposure of mechanical fasteners at the snow sliding surface (e.g., screw, bolt or rivet heads).

The snow slider replacement method of the present invention and the slider securing system for performing the same overcomes the disadvantages of prior art surface slider application schemes. With the present invention, a surface slider of the most desirable material can be provided in the most desirable slider configuration without concern for buckling of the surface slider during use or when worn. Such a surface slider can be quickly replaced with the surface slider replacement system of the present invention and is mounted with respect to the sled runner in such a manner that the snow sliding surface has no friction reducing fasteners or protrusions extending therefrom. The system and method of snow surface slider replacement of the present invention is easily used in the field, where conditions such as temperature and other weather conditions present important limiting factors in the fastening of a surface slider to a sled runner. In addition, the present invention allows the use of thinner surface sliders of certain desired materials than was previously possible with the prior art surface slider attachment schemes.

SUMMARY OF THE INVENTION

The present invention relates to a method for replacing a surface slider on a structural sled runner, and a component system for performing the same. The system includes slide rail means fixedly secured to a sled runner which has a longitudinally extending straight main portion and an upwardly curved front end portion. The slide rail means extends longitudinally along a bottom surface of the curved front and main portions of the sled runner and the slide rail means includes a longitudinally extending rail dovetail portion extending downwardly therefrom. Surface slider means removably mounted to the slide rail means has a longitudinally extending slider dovetail portion extending upwardly therefrom of configuration to mate with the rail dovetail portion in lateral cross-section along the entire length of each. This permits longitudinal slidable movement of the surface slider means with respect to the sled runner. The surface slider means has a ground cover contacting surface extending along a bottom side thereof and the surface slider means is removable from the slide rail means by peeling the surface slider means laterally away from the slide rail means. Longitudinal movement of the surface slider means with respect to the sled ski is prevented by releasable means operative on front end portions of the sled ski and of the surface slider means proximate only an upper end of the curved front portion of the sled runner.

In a preferred embodiment, the slide rail means includes a slide rail fixedly secured to the sled runner and an adapter removably mounted to the slide rail and bearing the rail dovetail portion thereon. The slide rail has a longitudinally extending second rail dovetail portion extending downwardly therefrom and the adapter has a longitudinally extending adapter dovetail portion extending upwardly therefrom and of configuration to mate with the second rail dovetail portion of the slide rail in lateral cross-section to permit longitudinal slidable movement of the adapter with respect to the sled runner. The releasable means includes second releasable means operative on front end portions of the sled runner and of the adapter proximate only the upper end of the curved front portion of the sled runner for preventing longitudinal movement of the adapter with respect to the sled runner. Preferably, the surface slider is partially bounded by two mutually converging longitudinally extending side surfaces slanted downwardly inwardly in lateral cross-section and by a generally planar longitudinally extending bottom ground cover contacting surface joining said side surfaces.

The snow slider replacement method of the present invention is performed by using the component system described above. The surface slider means includes a plurality of surface sliders, with each surface slider having a similarly configured slider dovetail portion on an upper side thereof. To replace a first surface slider which has its slider dovetail portion mated with the rail dovetail portion of the side rail means with a second surface slider first requires the moving of the first surface slider spatially outwardly with respect to the sled runner along the entire length thereof. Then, the second surface slider is slid longitudinally along the rail dovetail portion of the slide rail means from a rear end thereof toward an upper end of the curved front portion of the sled runner to mate the rail dovetail portion of the slide rail means and a slider dovetail portion of the second surface slider along the entire length of each. The second surface slider is then secured with respect to the sled runner proximate only the upper end of the curved front portion of the sled runner to prevent longitudinal movement therebetween when the slider dovetail portion of the second surface slider and rail dovetail portion of the slide rail means are mated together.

In a preferred embodiment of the slider replacement method, the step of moving the first surface slider spatially outwardly with respect to the sled runner along the entire length thereof includes peeling the slider dovetail portion of the first surface slider laterally away from the rail dovetail portion of the slide rail means along the entire length thereof. The lateral slider can also be slid off of the slide rail means. In either case, the surface slider is of construction and configuration such that its removal does not prevent its reinstallation and reuse on the slide rail means.

BRIEF DESCRIPTION OF THE DRAWINGS

FIG. 2 is a partial sectional view as taken along line 2—2 in FIG. 1.

FIG. 3 is a sectional view similar to FIG. 2 showing another embodiment of the present invention.

FIG. 4 is a sectional view similar to FIG. 2 showing a further embodiment of the present invention.

FIG. 5 is a sectional view as taken along line 5—5 in FIG. 1.

FIG. 8 is a sectional view similar to FIG. 5 showing a further embodiment of the present invention.

FIG. 9 is a partial sectional view as taken along line 9—9 in FIG. 8.

FIG. 10 is an enlarged perspective view (partially sectional) of a portion of the slider securing system of the present invention.

FIG. 11 is a sectional view similar to FIG. 2 showing a further embodiment of the present invention.

FIG. 12 is a sectional view similar to FIG. 2 showing a further embodiment of the present invention.

FIG. 13 is a sectional view similar to FIG. 5 showing a further embodiment of the present invention.

FIG. 14 is a sectional view similar to FIG. 2 showing a further embodiment of the present invention.

FIG. 15 is a sectional view similar to FIG. 2 showing a further embodiment of the present invention.

FIG. 16 is a sectional view similar to FIG. 2 showing a further embodiment of the present invention.

DETAILED DESCRIPTION OF THE PREFERRED EMBODIMENTS

Figure 1:
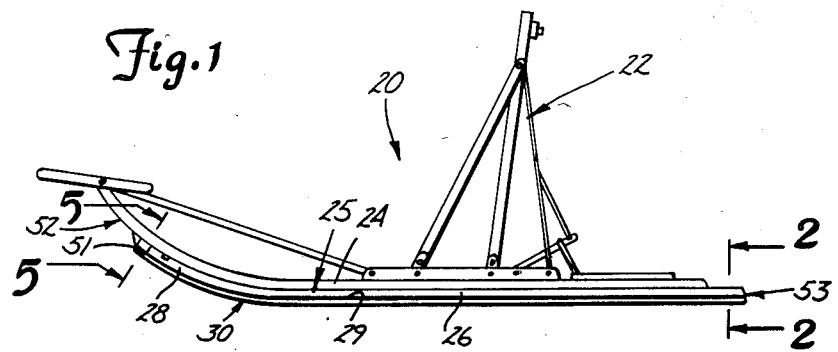
FIG. 1 is a side elevational view of a dog sled having the snow slider securing system of the present invention affixed to its structural sled runners.

In FIG. 1, a typical dog sled for canine-powered travel over snow or other ground cover is illustrated as at 20. The dog sled 20 has an upper framework 22 which is supported on an upper or "false" runner 24 which is fixed to a sled or "sub" runner 25. Since a dog sled is moved by being pulled, it is desirable to fashion the components of the dog sled from lightweight materials. Dog sled sliders or runners are typically made out of wood. Low friction and wear resistant snow surface sliders are typically affixed in some manner to the bottom of the sled runners to reduce friction between the snow sliding surfaces of the sled runners and the ground or snow.

The snow slider securing system of the present invention includes a surface slider 30 which is mounted under the sled runner 25 of the dog sled 20, as illustrated in FIG. 1. As shown, the sled runner 25 has a longitudinally extending straight main portion 26 and an upwardly curved front end portion 28. The surface slider 30 extends along the entire length of the straight main portion 26 and extends substantially over the curved front portion 28 of the sled runner 25. The surface slider 30 thus covers an entire bottom surface 29 of the sled runner 25 which otherwise would act as a snow sliding surface on the bottom of the sled runner 25. The use of such terms as upwardly, bottom, top, etc. in this description refer to the relative position of the components during use for snow travel, or as viewed in FIG. 1.

As best shown in FIG. 2, the slider securing system of the present invention also includes a slide rail 32 which is fixedly secured to the bottom surface 29 of the sled runner 25 to extend longitudinally along the curved front and main portions 26 and 28 thereof. The slide rail 32 has a longitudinally extending rail dovetail portion such as the tenon or male rail dovetail 34 shown in FIG. 2. The rail dovetail 34 extends downwardly from the slide rail 32 along its entire length. The slide rail 32 is secured to the sled runner 25 by suitable fastening means, such as countersunk screws 36. When the slide rail 32 is secured by fastening means such as screws 36, the slide rail 32 can be attached to existing sled runners or skiis of varying construction and design without modifying the existing structural sled runner or ski. In other embodiments of the invention (not shown), the slide rail can be formed integral with the sled runner as a unitary structural sled component or can be slide rail segments which are separately secured to the sled runner 25.

As stated, the surface slider 30 is removably mounted to the slide rail 32. The surface slider 30 has a longitudinally extending slider dovetail portion such as the mortise or female slider dovetail 38 as shown in FIG. 2. The slider dovetail 38 extends upwardly from an upper side 39 of the surface slider 30 along its entire length and is of configuration to mate with the rail dovetail 34 in lateral cross-section to permit longitudinal slidable movement of the surface slider 30 with respect to the slide rail 32 and sled runner 25.

The snow sliding surface (ground cover contacting surface) of the dog sled 20 is primarily defined by a bottom side sliding surface 40 of the surface slider 30. Side surfaces 42 and 44 of the surface slider 30 also constitute portions of the snow sliding surface in certain trail conditions. The surface slider 30 (as shown in FIG. 2) is preferably configured so that no part of slide rail 32 is exposed at the snow sliding surface. In addition, with the unique dovetail securing arrangement of surface slider 30 to sled runner 25, no slide rail fasteners (such as screws 36) are exposed at the snow sliding surface.

Further embodiments of the slider securing system of the present invention are shown in FIGS. 3 and 4. In FIG. 3, the slide rail 32 is thicker in lateral design, having an additional layer of material 46 extending between the surface slider 30 and sled runner 25. Such a shape for the slide rail 32 permits the construction of the slide rail 32 from materials which may be less expensive but which require additional material to attain the desired rigidity of the slide rail 32 along its longitudinal length. In this embodiment, the snow sliding surface includes side surfaces 48 and 50 of the material layer 46.

In FIG. 4, the male rail dovetail and female slider dovetail of the slide rail and surface slider, respectively, have been reversed. As illustrated in FIG. 4, the slide rail 32a now bears the female dovetail 34a and the surface slider 30a bears the male dovetail 38a. The slide rail 32a and surface slider 30a are otherwise the same in configuration and function as the slide rail 32 and surface slider 30, and other features of the slider securing system embodiment shown in FIG. 4 are labeled with reference characters corresponding to those in FIG. 3. In this description, slider securing system components which vary in configuration between embodiments bear the same reference numbers, but have different subscripts such as "a", "b", etc.

To mount a surface slider 30 on a slide rail 32 which is secured to a sled runner 25, one end of the surface slider 30 (typically a forward end 51) is aligned with one end of the slide rail 32 (typically a rearward end of the slide rail 32 proximate a rear end 53 of the sled runner 25) in lateral cross-section to mate the dovetails thereon. The surface slider 30 is then slid longitudinally with respect to the slide rail 32 to snugly mate their respective dovetails along the entire length of each. The surface slider 30 is moved along the entire straight main portion of the sled runner 25 and onto the upwardly curved front portion of the sled runner 25 to position as shown in FIG. 1. The present invention thus provides a quick and easy method for mounting a surface slider onto the sled runner of a dog sled. The slider securing system of the present invention is much more efficient that those of the prior art, since it allows the mounting of surface sliders when in the field. There is no need to secure the surface slider to the sled runner with a number of separate fasteners spaced longitudinally along the slider and no particular temperature or pressure conditions are required to affix the slider to the sled runner. In addition, once the surface slider has been applied, no slide rail fasteners interfere with the snow sliding surface.

One or more fasteners are provided adjacent the forward end 51 of the surface slider 30 to secure the surface slider 30 to the sled runner 25. These fasteners, mounted proximate an upper end 52 of the curved front portion 28 of the sled runner 25, prevent the surface slider 30 from moving longitudinally with respect to the sled runner 25. The fasteners are located as high as possible on the curved front portion 28 to minimize possible interference with the snow sliding surface. Each fastener constitutes a lateral protrusion such as a countersunk screw or friction fit fastener 54 (as shown in FIG. 5) which engages a lateral aperture 56 in the surface slider 50. The friction fit fastener 54 shown in FIG. 5 also passes through an aperture 58 in the slide rail 32 and into a bore 60 in the sled runner 25 and has a plurality of resilient teeth 62 which engage the sides of the bore 60 to hold the fastener 54 in place. A head 64 of the fastener 54 is thin, smooth and rounded to minimize interference with the snow sliding surface proximate the raised forward end 51 of the surface slider 30. The fastener head 64 can also be countersunk within the surface slider 30.

A single fastener is all that is required to prevent longitudinal movement of the surface slider 30 with respect to the sled runner 25. Each fastener is removable or releasable to permit the removal of the surface slider 30 from the sled runner 25. For example, the friction fit fastener 54 can be pulled out of the bore 60 and apertures 56 and 58 to allow the surface slider 30 to be moved with respect to the slide rail 32.

Figure 6:
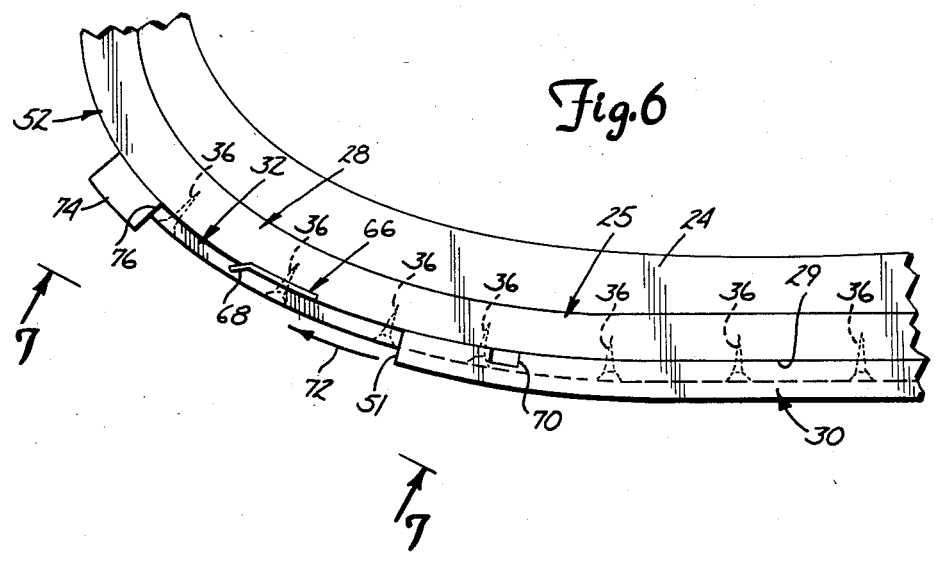
FIG. 6 is an enlarged partial side elevational view of the upwardly curved front end portion of a structural sled runner and components of the slider securing system of the present invention.
Figure 7:
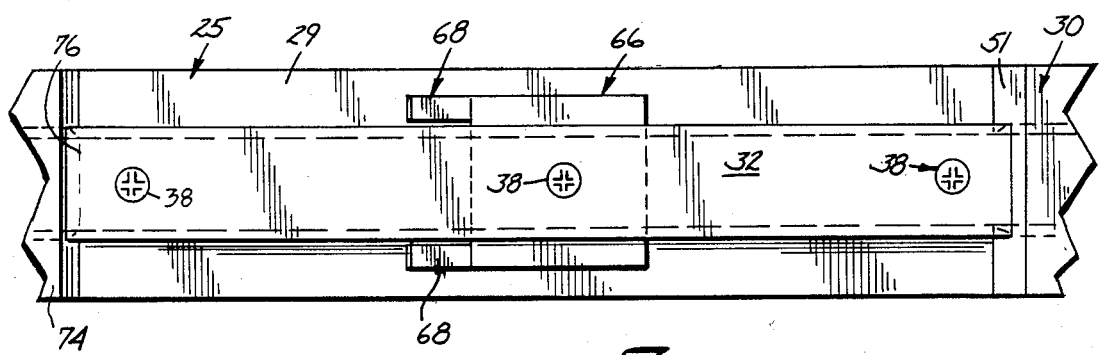
FIG. 7 is an enlarged partial bottom view as taken along line 7—7 in FIG. 6.

Other fastening schemes for limiting longitudinal movement of the surface slider 32 with respect to the sled runner 25 are shown in FIGS. 6–9. In FIGS. 6 and 7, a plate 66 is secured between the slide rail 32 and bottom surface 29 of the sled runner 25 as shown. The plate 66 has a pair of resilient tabs 68, 68 which straddle the slide rail 32 and are bent upwardly outwardly from the bottom surface 29 on the side of the plate 66 proximate the upper end 52 of the sled runner's curved front portion 28. The surface slider 30 has a notch 70 designed to receive the tabs 68 of the plate 66. As shown in FIG. 6, the surface slider 30 is mounted on the slide rail 32 by sliding it longitudinally in direction as illustrated by arrow 72 (from right to left). As the forward end 51 of the surface slider 30 engages the tabs 68, the tabs 68 are flattened against the bottom surface 29 of the sled runner 25. When the surface slider 30 is further moved so that notch 70 is positioned over the tabs 68, the tabs 68 spring upwardly into an engaging position within the notch 70.

The tabs 68 and cooperating notch 70 are configured to prevent movement of the surface slider 30 in direction opposite that of arrow 72 (to the right in FIGS. 6 and 7). A stop 74 secured to the sled runner 25 at a forward end 76 of the slide rail 32 engages the forward end 51 of the surface slider 30 to prevent further movement of the surface slider 30 in the direction indicated by arrow 72 (to the left as shown in FIGS. 6 and 7) once the notch 70 is aligned over the tabs 68. If it is desired to remove the surface slider 30 from the sled runner 25, the tabs 68 are pressed flush with the bottom surface 29 to permit movement of the surface slider 30 in direction opposite that of arrow 72 or to the right as viewed in FIGS. 6 and 7. Once the forward end 51 of the surface slider 30 has been slid past the tabs 68, the tabs 68 spring back up to position as shown in FIG. 6.

FIG. 8 shows a spring loaded fastener 80 which is secured within aligned bores 81 and 82 in the sled runner 25 and slide rail 32, respectively. The spring loaded fastener 80 has an internal spring 83 which biases a plunger pin 84 into an extended position as shown in FIG. 8. The pin 84 can be pushed into the fastener 80 against the force of spring 83 so that it is flush with a bottom surface 86 of the slide rail 32. As shown in FIG. 9, the forward end 51 of the surface slider 30 in this embodiment is provided with a ramp 88 which, as the surface slider 30 is moved in direction illustrated by arrow 89 in FIG. 9, engages the pin 84 and gradually depresses it flush with the bottom surface 86 of the slide rail 32. Rearwardly from the ramp 88, the surface slider 30 has a bore 90 aligned to receive the pin 84. Once the surface slider 30 is moved so that the bore 90 is positioned over the pin 84, the spring 83 urges the pin 84 into the bore 90 as shown in FIG. 8. The surface slider 30 is thus prevented from longitudinal movement with respect to the sled runner 25.

The various fastener schemes discussed above are suitable for use with all of the embodiments of the present invention herein described. In the fastener schemes shown in FIGS. 6 and 7 and in FIGS. 8 and 9, the fasteners are self actuating once the surface slider 30 has been slid into its desired position with respect to the sled runner 25. This is quite useful in the field where temperatures may be quite low and an operator's manual dexterity is impaired.

The surface slider 30 may be removed from the sled runner 25 by sliding it longitudinally with respect to the slide rail 32 thereon. Slider removal in this manner may present difficulties in some instances, such as when the surface slider has been deformed through wear or when snow or other material has infiltrated the joints between the surface slider 30 and slide rail 32 or sled runner 25 so that the surface slider 30 binds or jams when slid longitudinally with respect to the sled runner 25. For this reason, the size and shape of the cooperating dovetail portions are dimensioned to allow the surface slider 30 to be peeled laterally off of the slide rail 32.

In a preferred embodiment, the longitudinal sides of the dovetail portions are formed as 45° angles (when viewed in lateral cross-section as in FIG. 2). The surface slider 30 is formed from an ethylene polymer compound and the slide rail 32 is formed from stiffer material such as aluminum. To remove the surface slider 30 from the slide rail 32 by peeling, one end of the surface slider 30 is pried away from the slide rail 32 in direction as illustrated by arrow 90 in FIG. 10. Once one end has been pried loose, the entire surface slider 30 can be peeled off by pulling it laterally away from the sled runner 25 along its entire length.

The surface slider 30 can thus be quickly removed from the sled runner 25. In addition, when using the fastener schemes shown in FIGS. 6 and 7 and FIGS. 8 and 9, there is no independent step of releasing the fastener prior to peeling the surface slider 30 off. Once the surface slider 30 has been completely disengaged from the slide rail 32, another surface slider (of differing material for differing trail conditions or a replacement surface slider) can be mounted onto the slide rail 32 and secured into position with respect to the sled runner 25 as described above. A surface slider having means at each end for engagement with the fastener (such as aperture 56) is reversible to compensate for uneven wear and material conservation.

The method of removing the surface slider by peeling it laterally away from the sled runner is performed with all of the embodiments of a snow slider securing system shown herein. It does not matter whether the male dovetail is on the slide rail or surface slider. When the surface slider is peeled off of the slide rail, the dovetail portions of the surface slider and slide rail flex with respect to each other as they disengage. Preferably, the materials of the surface slider and slide rail are of configuration and construction such that this flexing does not substantially or permanently deform the dovetail portion of the surface slider and the surface slider may be reused. For example, a slider of certain material which is removed because of a change in trail conditions can later be reused when the original trail conditions resume.

With the snow slider securing system of the present invention, a surface slider can be removed and replaced outdoors in just a few minutes time. Preferably, the surface slider is as wide as the sled runner or ski to which it is affixed. For dog sleds, the lateral width of a surface slider is commonly either one and one quarter or one and one half inches. The respective dovetail dimension for a slider securing system of such relative size preferably ranges from 0.685 inches to 1.15 inches at the narrow or neck portion of the respective dovetail portions (with dovetail joint depths ranging from 0.05 to 0.09 inches). With such relative dimensions, dimensional tolerances achievable by economic fabrication methods (such as 10/1000 inch) result in a slider securing system that permits the surface slider to slide freely onto the slide rail, stay on the slide rail in use and slide off or peel off of the slide rail without incapacitating damage that would prevent reuse. In addition, the surface slider will peel off in the field despite the possible infiltration of snow or gravel between the surface slider, slide rail and sled runner.

The flexibility necessary for proper peel off of the surface slider is determined principally by the shape and elasticity of the material of the dovetail portion thereof. Thus, the external dimensions of the components of the slider securing system (e.g., width of the surface slider) can vary without affecting the dovetail sliding and peeling capabilities.

In one embodiment of the slider securing system of the present invention, an intermediate adapter 92 is provided between the slide rail 32 and surface slider 30. Examples of three adapter configurations are shown in FIGS. 11-13. In FIG. 11, the slide rail 32 is shaped similarly to the slide rail 32 in FIG. 2, having the male rail dovetail 34 thereon. The adapter 92 has a longitudinally extending adapter-rail dovetail portion 94 extending upwardly therefrom and of configuration (female) to mate with the rail dovetail 34 (male) of the slide rail 32 in lateral cross-section along the entire length. The adapter 92 is thus slidable longitudinally with respect to the sled runner 25.

The adapter 92 has an adapter-slider dovetail portion 96 extending downwardly on a bottom side thereof. In the embodiment shown in FIG. 11, the adapter-slider dovetail portion 96 is a female dovetail. A surface slider 30b has a longitudinally extending slider dovetail portion 38a (male, as shown in FIG. 4) which mates in lateral cross-section with the adapter-slider dovetail portion 96 along the entire length. The surface slider 30b is thus slidable longitudinally with respect to the adapter 92. The cooperating dovetail portions (1) 94 and 34 and (2) 96 and 38a are similar in construction, configuration, and function to the cooperating dovetails 34 and 38 previously discussed.

The configuration of the adapter is changable to accommodate different surface slider and slide rail shapes. For example, in FIG. 12, an adapter 92a is shown having an adapter-rail dovetail portion 94 similar to that of the adapter 92 in FIG. 11. The mating dovetail portions of the adapter and surface slider, however, are reversed from the configuration shown in FIG. 11. Adapter-slider dovetail portion 96a is a male dovetail in FIG. 12, while the surface slider 30 bears female slider dovetail 38.

FIG. 13 shows a further configuration of the adapter. In this embodiment, the slide rail is configured as slide rail 32a (as previously illustrated in FIG. 4.) having a female rail dovetail 34a extending longitudinally thereon. The adapter 92b has an adapter-rail dovetail portion 94a of male dovetail configuration to mate with the rail dovetail 34a. The surface slider 30b is mated to the adapter 92b with cooperating dovetail portions (adapter-slider dovetail portion 96 and slider dovetail 38a) similar to that described in FIG. 11. It is thus possible to change the configuration (in lateral cross-section) of the slide rails, adapters and surface sliders to achieve a desired slider securing system.

The adapter is removably mounted with respect to the slide rail and is secured with respect to the sled runner separately from the surface slider. Longitudinal movement of the adapter with respect to the sled runner is prevented by one or more fasteners such as the fasteners discussed and shown in FIGS. 5-9 with respect to the surface slider. In FIG. 13, a countersunk machine screw 97 is shown to illustrate one method for securing the adapter (92b) with respect to the sled runner 25 independently of the fastening of the surface slider 30b. The screw 97 is threaded through the adapter 92b to a threaded bore 98 in the slide rail 32a, with its tip being retained in a bore 99 in the sled runner 25. Only one such adapter fastener (such as screw 97) is required although more can be used. Each adapter fastener is releasably mounted on front end portions of the sled runner 25 and adapter 92 proximate only the upper end 52 of the curved front portion 28 of the sled runner 25. Thus, a surface slider 30 can be peeled or slid off of the adapter 92 while the adapter 92 remains mounted to the sled runner 25. The adapter, in turn, is removable and replaceable with respect to the slide rail in the same manner as the surface slider as described above.

The use of separate fasteners for securing the adapter 92 and surface slider 30 with respect to the sled runner 25 provides a number of advantages. Because the adapter and surface slider are secured only at front end portions thereof, the surface slider and adapter are free to independently expand or contract longitudinally as necessary to relieve thermal stresses or to accommodate elongation resulting from cold working of either component. This reduces the possibility of buckling or bubbling of the surface slider or adapter, which was frequently a problem in prior art attachment schemes, especially with thin or less rigid slider materials. In addition, these components are stressed in tension in transmitting surface drag to the dog sled when in use, which also reduces the potential for buckling or bubbling of these components. The fasteners are elevated from the ground or snow to the greatest extent possible because of their placement proximate only the upper end of the curved front portion of the sled runner. This not only minimizes interference with the snow sliding surface, but reduces the possibility of damage to the fasteners. These advantages are equally appliable in the embodiment of the slider securing system of the present invention when the surface slider is mounted directly to the slide rail and no adapter is used.

The use of an adapter such as adapter 92 permits the use of thinner surface sliders than was previously possible. This allows the use of more expensive but more desireable materials (such as tetrafluorethylene polymer compounds) as surface sliders. Such thin surface sliders are preferably shaped as surface slider 30b in FIGS. 11 and 13 and the surface slider is made as wide as possible. In lateral cross-section, the surface slider 30b is partially bounded by two mutually converging longitudinally extending side surfaces 100 and 102 and by a generally planar longitudinally extending bottom ground cover contacting surface 104 joining said side surfaces 100 and 102. In some trail conditions, a surface slider having the configuration of surface slider 30b tracks and slides better than a surface slider having square edges between its bottom and side surfaces (such as surface slider 30 or 30a in FIGS. 3 and 4).

The exposed portions of the adapter 92 or 92b are subject to some wear at the snow sliding surface. The surface slider 30b can be as thin as the depth of the slider dovetail 96. Of course, the thicker the surface slider 30b, the less wear on exposed parts of the adapter. The adapter is preferably constructed of a relatively durable, good performance snow sliding material such as ultra-high molecular weight polyethylene. The adapter thus provides a temporary back up sliding surface material in the event of the failure of the thinner (and for some materials less durable) surface slider. The use of an adapter also prevents damage to the slide rail, which is more difficult to replace. The configuration for the adapter 92a shown in FIG. 12 has the advantage that as long as the surface slider 30 is intact, no part of the bottom surface of the adapter 92a is exposed to the ground or ground cover.

In actual use of the slider securing system of the present invention, there is a tendency for snow to infiltrate the joints between the surface slider, adapter and slide rail. While such snow particles may inhibit the sliding movement of the components relative to one another upon removal or replacement, the snow actually packs in between the components to force them together and thereby increas the rigidity and durability of the slider securing system as a whole.

The surface sliders 30, 30a and 30b, as shown and discussed have relatively planar and smooth bottom surfaces 40 (or 104 in the case of surface slider 30b). Under certain trail conditions, it may be desirable to use a surface slider with different snow sliding surface geometries. FIGS. 14 and 15 show alternative embodiments of the bottom surface 40 of the surface slider 30. In FIG. 14, the surface slider 30 is shown having a longitudinally extending central rib 106 connecting two longitudinally extending concave surfaces 108 and 110 to define the bottom surface 40 thereof. In FIG. 15, the bottom surface 40 has a plurality of grooves 112 extending longitudinally thereon. IN FIG. 16, a polyethylene surface slider 30 is shown provided with a sliding surface wear strip 114 on the bottom side 40 thereof. The wear strip 114 is preferably formed from a thin sheet of ASAE 1095 hard tempered spring steel which is riveted to the surface slider 30 by a plurality of countersunk rivets 116.

Sliders of differing configurations and materials are thus interchangeable on a sled runner 25 having a slide rail 32 secured thereto. A supply of surface sliders may be carried on the dog sled, with a surface slider of particular geometry and composition mounted on the sled runner to attain optimum sliding performance for the prevailing trail conditions.

In operation, therefore, the slider securing system of the present invention provides a quick and easy means for replacing surface sliders. When it is desired to replace a surface slider 30 (such as shown in FIG. 2) which is mated to the slide rail 32, one end of said surface slider 30 is first pried away from the slide rail 32. The surface slider 30 is then peeled laterally away from the sled runner 25 along the entire length thereof. The slider dovetail 38 at one end of a second surface slider 30 is then aligned with the rail dovetail 34 at one end of the slide rail 32. Once positioned in dovetail mated alignment, the second surface slider 30 is slid longitudinally along the rail dovetail 34 from a rear end thereof toward the upper end 52 of the sled runner's curved front portion 28. This mates the rail dovetail 34 with the corresponding slider dovetail 38 of the second surface slider 30 along the entire length of each. The second surface slider 30 is then secured with respect to longitudinal movement relative to the sled runner 25 by appropriate fastening means, such as the spring loaded fastener 80 shown in FIGS. 8 and 9, which is positioned proximate only the upper end 52 of the curved front portion 28 of the sled runner 25.

When an adapter 92 is part of the slider securing system (such as shown in FIG. 11), a surface slider 30b is removed or replaced by peeling or sliding the surface slider 30b from the adapter 92 while the adapter remains secured to the slide rail 32. The slider dovetail 38a at one end of a second surface slider 30b is then aligned with the adapter-slider dovetail portion 96 at one end of the adapter 92. Once positioned in dovetail mated alignment, the second surface slider 30b is slid longitudinally along the adapter-slider dovetail portion 96 from a rear end thereof toward the upper end 52 of the sled runner's curved front portion 28. This mates the adapter-slider dovetail portion 96 of the adapter 92 and the slider dovetail portion 38a of the second surface slider 30b along the entire length of each. Since the adapter 92 is separately secured with respect to the sled runner 25 (by fastening means such as screw 97 as shown in FIG. 13), the adapter 92 does not move longitudinally with respect to the sled runner 25 when the second surface slider 30b is slidably mounted thereof. After the second surface slider 30b is fully mounted to the adapter 92, the slider fastener is actuated to limit longitudinal movement therebetween.

The adapter 92 is similarly mounted to the slide rail 32 by the dovetail mounting arrangement as described above. For replacement or removal, the adapter 92 is peeled or slid off of the slide rail 32. Thus, when exposed portions of the adapter 92 become worn or damaged, the adapter 92 can be easily and quickly replaced.

Although the present invention has been described with reference to preferred embodiments, workers skilled in the art will recognize that changes may be made in form and detail without departing from the spirit and scope of the invention.

What is claimed is:

1. A system for quickly and replaceably securing snow surface sliders to a sled runner which has a longitudinally extending straight main portion and an upwardly curved front end portion, the surface slider securing system comprising:
   slide rail means fixedly secured to a sled runner to extend longitudinally along a bottom surface of the curved front and main portions thereof, the slide rail means including a longitudinally extending first rail dovetail portion extending downwardly therefrom;
   a surface slider removably mounted to the slide rail means, the surface slider having a longitudinally extending second slider dovetail portion extending upwardly therefrom of configuration to mate with the first rail dovetail portion in lateral cross-section to permit longitudinally slidable movement of the surface slider with respect to the sled runner, the surface slider having a ground cover contacting surface extending along a bottom side thereof and the dovetail portion of the surface slider being resilient so that the surface slider is removable from the slide rail means by peeling the surface slider laterally away from the slide rail means without permanently deforming the dovetail portions of the surface slider and slide rail means to an extent which prevents remounting of the surface slider on the slide rail means; and releasable means operative on front end portions of the sled runner and of the surface slider proximate only an upper end of the curved front portion of the sled runner for preventing longitudinal movement of the surface slider with respect to the sled runner.

2. The slider securing system of claim 1 wherein the releasable means comprises a lateral protrusion retractably mounted to the sled runner for engagement with the surface slider upon extension into a lateral aperture thereof.

3. The slider securing system of claim 1 wherein the releasable means comprises a lateral protrusion removably mounted with respect to the surface slider and slide rail means.

4. The slider securing system of claim 1 wherein the surface slider is partially bounded by two mutually converging longitudinally extending side surfaces slanted downwardly inwardly in lateral cross-section and by a generally planar, longitudinally extending bottom ground cover contacting surface joining said side surfaces.

5. A system for quickly and replaceably securing snow surface sliders to a sled runner which has a longitudinally extending straight main portion and an upwardly curved front end portion, the surface slider securing system comprising:

slide rail means fixedly secured to a sled runner to extend longitudinally along a bottom surface of the curved front and main portions thereof, the slide rail means including a slide rail fixedly secured to the sled runner and an adapter removably mounted to the slide rail and bearing a longitudinally extending first rail dovetail portion extending downwardly therefrom;

a surface slider removably mounted to the slide rail means, the surface slider having a longitudinally extending second slider dovetail portion extending upwardly therefrom of configuration to mate with the first rail dovetail portion in lateral cross-section to permit longitudinally slidable movement of the surface slider with respect to the sled runner, the surface slider having a ground cover contacting surface extending along a bottom side thereof and the dovetail portion of the surface slider being resilient so that the surface slider is removable from the slide rail means by peeling the surface slider laterally away from the slide rail means without permanently deforming the dovetail portions of the surface slider and slide rail means to an extent which prevents remounting of the surface slider on the slide rail means; and releasable means operative on front end portions of the sled runner and of the surface slider proximate only an upper end of the curved front portion of the sled runner for preventing longitudinal movement of the surface slider with respect to the sled runner.

6. The slider securing system of claim 4 wherein the slide rail has a longitudinally extending third rail dovetail portion extending downwardly therefrom and the adapter has a longitudinally extending fourth adapter dovetail portion extending upwardly therefrom and of configuration to mate with the third rail dovetail portion of the slide rail in lateral cross-section to permit longitudinal slidable movement of the adapter with respect to the sled runner, and wherein the releasable means includes second releasable means operative on front end portions of the sled runner and of the adapter proximate only the upper end of the curved front portion of the sled runner for preventing longitudinal movement of the adapter with respect to the sled runner.

7. The slider securing system of claim 5 wherein the surface slider is partially bounded by two mutually converging longitudinally extending side surfaces slanted downwardly inwardly in lateral cross-section and by a generally planar, longitudinally extending bottom ground cover contacting surface joining said side surfaces.

8. In a vehicle of the type having at least one sled runner which has a longitudinally extending straight main portion and an upwardly curved front end portion, slide rail means fixedly secured to the sled runner along a bottom surface of the curved front and main portions thereof and having a longitudinally extending first rail dovetail portion extending downwardly therefrom along its entire length, and a plurality of resilient surface sliders with each surface slider having a ground cover contacting surface extending along a bottom side thereof and a longitudinally extending second slider dovetail portion on an upper side thereof of construction and configuration to mate with the first rail dovetail portion of the slide rail means in lateral cross-section along the entire length of each with a first one of said resilient surface sliders being so mated to the slide rail means, a method for replacing the first surface slider with a second one of said resilient surface sliders which comprises the steps of:

moving the first resilient surface slider spatially outwardly with respect to the sled runner along the entire length thereof by peeling the second slider dovetail portion of the first resilient surface slider laterally away from the first rail dovetail portion of the slide rail means along the entire length thereof without permanently deforming the dovetail portions of the first resilient surface slider and slide rail means;

sliding the second resilient surface slider longitudinally along the first rail dovetail portion of the slide rail means from a rear end thereof toward an upper end of the curved front portion of the sled runner to mate the first rail dovetail portion of the slide rail means and second slider dovetail portion of the second surface slider along the entire length of each; and securing the second surface slider with respect to the sled runner proximate only the upper end of the curved front portion of the sled runner to prevent longitudinal movement therebetween when the second slider dovetail portion of the second surface slider and first rail dovetail portion of the slide rail means are mated together.

9. In a vehicle of the type having at least one sled runner which has a longitudinally extending straight main portion and an upwardly curved front end portion, slide rail means which includes a slide rail fixedly secured to the sled runner along a bottom surface of the curved front and main portions thereof and an adapter removably mounted to the slide rail and bearing a longitudinally extending first rail dovetail portion extending downwardly therefrom along its entire length, and a plurality of resilient surface sliders with each surface slider having a ground cover contacting surface extending along a bottom side thereof and a longitudinally extending second slider dovetail portion on an upper side thereof of construction and configuration to mate with the first rail dovetail portion of the slide rail means in lateral cross-section along the entire length of each with a first one of said resilient surface sliders being so mated to the slide rail means, a method for replacing the first surface slider with a second one of said resilient surface sliders which comprises the steps of:

moving the first resilient surface slider spatially outwardly with respect to the sled runner along the entire length thereof;

sliding the second resilient surface slider longitudinally along the first rail dovetail portion of the slide rail means from a rear end thereof toward an upper end of the curved front portion of the sled runner to mate the first rail dovetail portion of the slide rail means and slider dovetail portion of the second surface slider along the entire length of each; and securing the second surface slider with respect to the sled runner proximate only the upper end of the curved front portion of the sled runner to prevent longitudinal movement therebetween when the second slider dovetail portion of the second surface slider and first rail dovetail portion of the slide rail means are mated together.

10. In a vehicle of the type having at least one sled runner which has a longitudinally extending straight main portion and an upwardly curved front end portion, a slide rail fixedly secured to the sled runner along a bottom surface of the curved front and main portions thereof and an adapter removably mounted to the slide rail and bearing a longitudinally extending first rail dovetail portion extending downwardly therefrom along its entire length, the slide rail having a longitudinally extending second rail dovetail portion extending downwardly therefrom and the adapter having a longitudinally extending adapter dovetail portion extending upwardly therefrom and of configuration to mate with the second rail dovetail portion in lateral cross-section along the entire length thereof, and a plurality of surface sliders with each surface slider having a ground cover contacting surface extending along a bottom side thereof and a longitudinally extending slider dovetail portion on an upper side thereof of construction and configuration to mate with the first rail dovetail portion of the adapter in lateral cross-section along the entire length of each with a first one of said resilient surface sliders being so mated to the adapter, a method for replacing the first surface slider with a second one of said surface sliders which comprises the steps of:

moving the first surface slider spatially outwardly with respect to the sled runner along the entire length thereof;

sliding the second surface slider longitudinally along the first rail dovetail portion of the adapter from a rear end thereof toward an upper end of the curved front portion of the sled runner to mate the first rail dovetail portion of the adapter and slider dovetail portion of the second surface slider along the entire length of each; and securing the second surface slider with respect to the sled runner proximate only the upper end of the curved front portion of the sled runner to prevent longitudinal movement therebetween when the slider dovetail portion of the second surface slider and first rail dovetail portion of the slide rail means are mated together.

11. A replaceable snow surface slider for a sled runner which has a longitudinally extending straight main portion and an upwardly curved front end portion and which has slide rail means fixedly secured thereto to extend longitudinally along a bottom surface of the curved front and main portions thereof, with the slide rail means including a longitudinally extending first rail dovetail portion extending downwardly therefrom, the surface slider comprising:

a longitudinally extending surface slider removably mounted to the slide rail means and selectively secured to the sled runner for preventing longitudinal movement of the surface slider with respect to the sled runner at a single point proximate an upper end of the curved front end portion of the sled runner, the surface slider having a longitudinally extending second slider dovetail portion extending upwardly therefrom of configuration to mate with the first rail dovetail portion in lateral cross-section to permit longitudinally slidable movement of the surface slider with respect to the sled runner when the surface slider is not secured thereto at said single point, the surface slider having a ground cover contacting surface extending along a bottom side thereof and the dovetail portion of the surface slider being resilient so that the surface slider is removable from the slide rail means by peeling the surface slider laterally away from the slide rail means without permanently deforming the dovetail portions of the surface slider and slide rail means to an extent which prevents remounting of the surface slider on the slide rail means.

12. The snow surface slider of claim 11, wherein the slide rail means comprises:

a slide rail fixedly secured to the sled runner; and an adapter removably mounted to the slide rail and bearing the rail dovetail portion thereon.

13. The snow surface slider of claim 12, wherein the slide rail has a longitudinally extending third rail dovetail portion extending downwardly therefrom and the adapter has a longitudinally extending fourth adapter dovetail portion extending upwardly therefrom and of configuration to mate with the third rail dovetail portion of the slide rail in lateral cross-section to permit longitudinal slidable movement of the adapter with respect to the sled runner.

14. The slider securing system of claim 11 wherein the surface slider is partially bounded by two mutually converging longitudinally extending side surfaces slanted downwardly inwardly in lateral cross-section and by a generally planar, longitudinally extending bottom ground cover contacting surface joining said side surfaces.

15. The snow surface slider of claim 13, and further comprising releasable means operative on front end portions of the sled runner and of the adapter proximate only the upper end of the curved front portion of the sled runner for preventing longitudinal movement of the adapter with respect to the sled runner.

* * * * *